(12) United States Patent
Schmitt et al.

(10) Patent No.: US 7,583,081 B2
(45) Date of Patent: Sep. 1, 2009

(54) MAGNETOSTRICTIVE MULTI-LAYER SENSOR FOR DETECTING A DEFORMATION

(75) Inventors: Stephan Schmitt, Munich (DE); Juergen Zimmer, Ottobrunn (DE)

(73) Assignee: Infineon Technologies AG, Munich (DE)

( * ) Notice: Subject to any disclaimer, the term of this patent is extended or adjusted under 35 U.S.C. 154(b) by 6 days.

(21) Appl. No.: 11/925,426

(22) Filed: Oct. 26, 2007

(65) Prior Publication Data
US 2008/0060443 A1    Mar. 13, 2008

Related U.S. Application Data

(63) Continuation of application No. 11/174,808, filed on Jul. 5, 2005, now Pat. No. 7,319,322.

(30) Foreign Application Priority Data

Jul. 5, 2004  (DE) .................. 10 2004 032482

(51) Int. Cl.
*G01R 33/02* (2006.01)
(52) U.S. Cl. .................. 324/252; 324/260; 324/209; 73/779; 73/862.391
(58) Field of Classification Search ................ 324/209, 324/207.13, 228, 232, 235–244, 260–262, 324/252, 763, 774, 779, 862, 391
See application file for complete search history.

(56) References Cited

U.S. PATENT DOCUMENTS 4,884,453 A    12/1989  Hoffmann et al.
5,168,760 A    12/1992  Wun-Fogle et al.
5,450,755 A    9/1995   Saito et al.
5,856,617 A    1/1999   Gurney et al.

(Continued)

FOREIGN PATENT DOCUMENTS

DE    101 05 894 A1    9/2002

(Continued)

OTHER PUBLICATIONS

"Strain Sensors Based on Magnetostrictive GMR/TMR Structures", M.Löhndorf, T.A. Duenas, Alfred Ludwig, M. Rührig, J. Wecker, D. Bürgler, P. Grünberg and Eckhard Quandt, IEEE Transactions on Magnetics, vol. 38, No. 5, Sep. 2002, 2826-2828.

(Continued)

*Primary Examiner*—Jay M Patidar
(74) *Attorney, Agent, or Firm*—Eschweiler & Associates, LLC

(57) ABSTRACT

A sensor includes a substrate having a mechanically deformable region that is deformable in a direction non-parallel to a surface of the substrate, and a magnetostrictive multi-layer sensor element configured to detect a mechanical deformation of the mechanically deformable region in a direction that is non-parallel to the substrate surface. The multi-layer sensor element includes a sensor layer having a material having a positive or a negative magnetostriction constant. The sensor further includes a device, arranged on the substrate, that is configured to generate a controllable magnetic field by which a performance of the magnetostrictive multi-layer sensor element is influenced, wherein the magnetostrictive multi-layer sensor element exhibits an electrical resistance that is a function of the controllable magnetic field and a deformation of the mechanically deformable region.

23 Claims, 6 Drawing Sheets

U.S. PATENT DOCUMENTS

| | | |
|---|---|---|
| 6,988,414 B2 | 1/2006 | Ruhrig et al. |
| 2004/0050172 A1 | 3/2004 | Quandt et al. |
| 2006/0251928 A1 | 11/2006 | Quandt et al. |

FOREIGN PATENT DOCUMENTS

| | | |
|---|---|---|
| DE | 103 25 741 A1 | 2/2004 |
| DE | 102 50 358 A1 | 5/2004 |
| WO | WO 95/28649 A1 | 10/1995 |

OTHER PUBLICATIONS

"Highly Sensitive Strain Sensors Based on Magnetic Tunneling Junctions", M.Löhndorf, T. Duenas, M. Tewes and E. Quandt, Applied Physics Letters, vol. 81, No. 2, Jul. 8, 2002, pp. 313-315.

"Adapting GMR Sensord for Integrated Devices", K. Ludwig, J. Hauch, R. Mattheis, K.-U. Barholz and G. Rieger, Sensors and Actuators A 106, 2003, pp. 15-18.

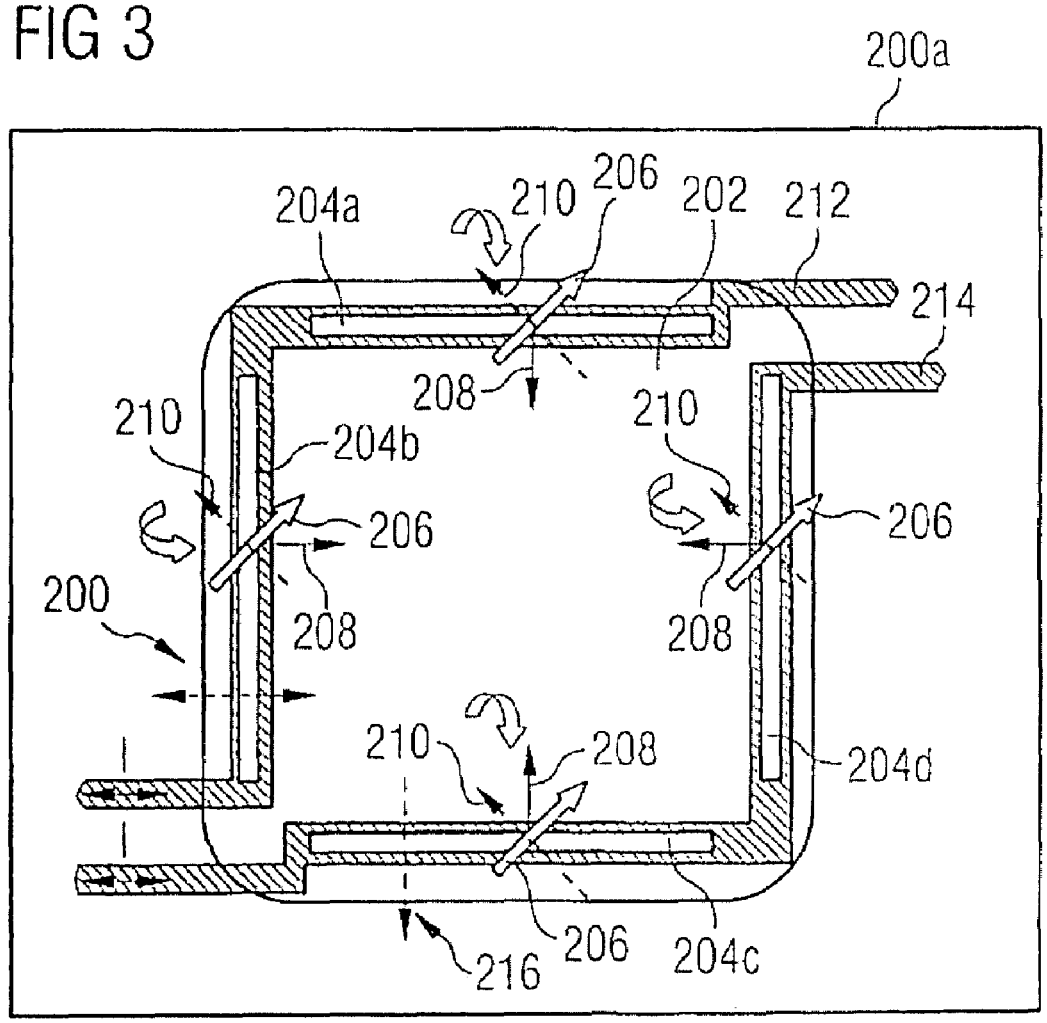

MAGNETOSTRICTIVE MULTI-LAYER SENSOR FOR DETECTING A DEFORMATION

CROSS-REFERENCE TO RELATED APPLICATION

This application is a continuation of Ser. No. 11/174,808, now U.S. Pat. No. 7,319,322 filed Jul. 5, 2005, which is entitled "Sensor and Method for Detecting a Deformation", which claims priority from German Patent Application No. 10 2004 032 482.4, which was filed on Jul. 5, 2004, and is incorporated herein by reference in its entirety.

BACKGROUND OF THE INVENTION

1. Field of the Invention

The present invention relates to magnetostrictive multi-layer systems for detecting a mechanically deformable region on a substrate.

2. Description of Related Art

Today, magnetostrictive multi-layer systems, such as, for example, spin-valve systems, are employed as sensors in various ways. The document K. Ludwig et al. "Adapting GMR sensors for integrated devices" Sensors and Actuators A, 106, 2003, pp. 15-18, for example, describes an application of GMR sensors in integrated devices as current sensors and magneto-couplers. The GMR magneto-couplers comprise a coil layer where a signal current is converted into a magnetic field. By applying a magnetic field by means of a current in the coil layer, the output signal of the magneto-coupler is shifted to positive values due to ferromagnetic coupling when the magnetic field applied is along the direction of the magnetization of the magnetically hard layer. The shift may be compensated by arranging four sensors in a bridge structure so that a sensor output characteristic can be adjusted or designed by designing geometrical arrangements correspondingly. Furthermore, WO/95/28649 shows a magnetic field sensor where an auxiliary magnetic field is generated to adjust an operating point of the magnetic field sensor. The auxiliary magnetic field can be generated by an electrical conductor, wherein in feedback operation a voltage of the magnetic field sensor elements is kept constant and the current through the electrical conductor is measured.

Lately, ever-increasing fields of application have developed in sensor technology for magnetoresistive GMR/TMR multi-layer systems (GMR/TMR=giant magneto resistance/tunneling magneto resistance) due to their extraordinary characteristics with regard to sensitivity and structural sizes required. Spin-valve systems on the basis of GMR systems or TMR systems principally comprise a layer setup where a magnetically hard layer the magnetization of which is pinned is arranged above or below a magnetically soft layer the magnetization of which may be adjusted freely in an external magnetic field. The magnetically hard layer and the magnetically soft layer are separated from each other by a non-magnetic layer which, in a GMR system, is a non-ferromagnetic metal layer and, in a TMR system, includes a non-metallic insulating layer. Magnetostrictive GMR/TMR structures can be employed as extensometers at micromechanical bending beams or movable membranes for detecting accelerations or pressure. It is of advantage in such structures for the free layer to be formed of a material comprising high magnetostriction to obtain the highest sensitivity possible.

When manufacturing such sensors, deviations caused by the manufacturing, however, must be expected, such as, for example, due to the dimensions and thickness of the micromechanical bending beams or of the movable membranes, affecting the mechanical sensitivity of the sensor.

Furthermore, deviations of the magnetic characteristics of the active GMR/TMR layers result, such as, for example, of the relative position of the magnetizations or of the anisotropy field strengths having an effect on the magnetostrictive sensitivity. The deviations mentioned above inevitably result in yield losses with a predetermined product specification, considerably increasing the costs for manufacturing spin-valve-based sensors in industrial production.

Apart from the difficulties of a cheap manufacturing of spin-valve-based sensors, these systems also entail operating difficulties.

Since the magnetostrictive effect is a non-linear effect, the output signal or well-known sensors can only be described roughly in a small range by means of a first-order function. Consequently, it is not possible to obtain a linear output signal over the entire operating range of the sensor without performing complicated subsequent correctional calculations of the output signals. Apart from the fact that the additional provision of calculating capacities of this kind results in an enlargement of the devices or blocks calculating capacities present, it is necessary with certain applications to provide output signals with high precision without delay, such as, for example, in acceleration sensors employed in the automobile sector. Using complicated calculations here is not only frequently of disadvantage but sometimes even impossible.

Consequently, it would be desirable to keep the cost and complexity of the evaluating electronics in a sensor as small as possible, i.e. to obtain a reproducible output characteristic field having the highest linearity possible, such as, for example, a linear extension/resistance output characteristic field.

Furthermore, adjusting the operating point of the sensitivity entails great problems, in particular because a reproducible sensitivity is not possible for certain operating points of well-known sensors. In addition, the sensitivity of well-known spin-valve sensors is not constant over the entire extension range, wherein additionally saturation effects occur, resulting in a flattening of the output characteristic curve and thus strongly limiting the operating region. This might have the effect that sensors cannot be used for certain applications where a deformation must be detected over a wide range, such as, for example, in acceleration sensors subjected to high accelerations.

With regard to a performance of GMR/TMP structures under mechanical extension, the document M. Löhndorf et al. "Strain Sensors based on magnetostrictive GMR/TMR structures", IEEE Transaction on Magnetics, Vol. 38, No. 5, 2002 discloses results of measurements with GMR multi-layer systems and MTJ systems where a mechanical extension is caused by a bending apparatus. A magnetic field was applied during the measurements to record the course of the resistance as a function of the magnetic field. Due to the higher MR ratio (magneto-resistance ratio), the usage of MTJ systems in magnetostrictive applications is thought of as being of advantage.

In addition, the document M. Löhndorf et al. "Highly sensitive strain sensors on magnetic tunneling junctions", Appl. Phys. Letter, Vol. 81, No. 2, 2002, pp. 313-315 describes measurements with MTJ systems where a magnetic field is applied in a first configuration in parallel to the magnetization axis of the MTJ system and the direction of an extension applied. In a second configuration, the extension applied is applied perpendicularly to the magnetic field applied and the magnetization axis of the MTJ system. For the first configuration in parallel to the magnetization axis of the MTJ system, the occurrence of hystereses can be observed, whereas considerably reduced hysteresis effects can be observed with the second configuration of a perpendicularly applied extension.

SUMMARY OF THE INVENTION

It is an object of the present invention to provide a magnetostrictive multi-layer sensor having improved characteristics. The following discussion refers to soft magnetic sensor layers made of materials having positive magnetostriction constants. The results, however, with a corresponding change of the relative orientation of the magnetizations of soft and hard layers and of the direction of extension, in principal also apply to material systems having a negative magnetostriction constant.

In accordance with a first aspect, the present invention provides a sensor having: a substrate having a mechanically deformable region; a magnetostrictive multi-layer sensor element for detecting a mechanical deformation of the mechanically deformable region, the multi-layer sensor element having a sensor layer consisting of a material having a positive or a negative magnetostriction constant; and a device, arranged on the substrate, for generating a controllable magnetic field by which a performance of the sensor element is influenced.

In accordance with a second aspect, the present invention provides a method for detecting a deformation of a mechanically deformable region arranged on a substrate by means of a magnetostrictive multi-layer sensor element, having the steps of: adjusting an operating point of the magnetostrictive multi-layer sensor element by applying a magnetic field; and detecting a value indicating the mechanical deformation of the mechanically deformable region at the position of the magnetostrictive multi-layer sensor element.

The present invention is based on the finding that, by providing a device arranged on the substrate for generating a magnetic field, the characteristics or performance of such multi-layer sensor elements can be influenced advantageously by the magnetic field generated according to the invention.

The inventive generation of a controllable magnetic field by an integrated device particularly allows overcoming the disadvantages of the well-known magnetostrictive spin-valve-based sensors mentioned above, as will be discussed subsequently.

A multi-layer sensor element is thought of as a system having several magnetic layers which are arranged above one another and may be separated by non-magnetic layers.

The magnetostrictive multi-layer sensor element may exhibit a dependence of the electrical resistance on both a magnetic field and on a deformation of the deformable region at the position of the sensor.

A multi-layer sensor element may, for example, be a GMR sensor element or a TMR sensor element. So-called spin-valve structures including two magnetic layers separated from each other by a non-magnetic layer are, for example, suitable as GMR/TMR individual elements for measuring the extension. The layer resistance of the structure depends on the relative angle between the magnetization directions of the two magnetic layers. One of the magnetic layers is pinned, whereas the other one is magnetically soft and may switch its magnetization direction by an external magnetic field and/or by strain or extension, correlating with a change in the layer resistance. Using such GMR/TMR individual elements has the advantage that the magnetization directions of both layers, with no magnetic field being applied (H=0), can be oriented to each other at will by a specific process management. If the two magnetizations are parallel, the layer resistance will be minimal, whereas a maximum layer resistance will result with an anti-parallel orientation. The resistance is proportional to $\cos(\Phi)$, $\Phi$ being the angle between the two magnetizations. By means of the inventively applied external magnetic field, the effect of the polarization switch of the soft layer can be either increased or decreased by extension.

This allows adjusting the operating point, such as, for example, to obtain an offset compensation, for compensating deviations of the mechanically formable region related to manufacturing, such as, for example, of the bending beam or membrane geometry (mechanical sensitivity) or of the GMR/TMR layer characteristics, i.e. magnetic sensitivity. Additionally, the externally applied magnetic field allows a dynamic tracking of the operating point such that an extended operating range or a linear signal, for example, can be obtained over the entire extension range. By inventively applying a controllable magnetic field, non-linearity occurring in systems of this kind, for example, is avoided by selecting that characteristic curve comprising the most favorable characteristics with regard to linearity by applying a magnetic field. A linearity of the output signal may, for example, be obtained here over an entire operating range. Additionally, it is possible to select precisely that characteristic curve presently having the highest sensitivity by controlling the magnetic field correspondingly.

The device for generating the external magnetic field is preferably integrated on a semiconductor, such as, for example, on a silicon chip. The integration of the device for generating the magnetic field not only has the effect of a simple system integration and production of the device by well-known process steps, but additionally allows a cheap generation of the magnetic field with high precision with regard to direction and magnitude.

The generation of the magnetic field can take place in a particularly advantageous and simple manner by conductor structures, such as, for example, conductive tracks. In one embodiment, the conductive tracks may be deposited on the passivated GMR/TMR resistors. The result is a small distance between the conductive track and the GMR/TMR structure only determined by the passivation thickness.

This allows obtaining a magnetic field of several kA/m with small currents in the range of some mA, depending on the conductor geometry. The distance of the conductive track from the sensor elements here is preferably in a range of 40-1200 nm.

The conductor structure may be formed of one or several straight conductors which is/are formed above or below one or several sensor elements.

With regard to a geometrical arrangement of the device for generating the magnetic field, different configurations may be provided depending on the specification and the field of application of the sensor. The magnetic fields may, for example, be generated such that they are applied in parallel or perpendicularly to a direction of the extension.

Additionally, different magnetizations of the magnetically hard and magnetically soft layers may be provided in applications where the sensor element includes spin-valve sensor elements. In one embodiment, the sensor element is arranged such that the magnetizations of the soft and the magnetically hard layers of the spin-valve sensor elements are each arranged in parallel to one another. In this embodiment, for allowing a detection of an extension with high sensitivity, the sensor element is preferably arranged on the deformable region such that the magnetizations of the soft of the magnetically hard layers are perpendicular to the extension direction at the position of the sensor element with no magnetic field applied and no extension applied, wherein the magnetic field is generated in parallel to the magnetizations of the layers of the sensor element, i.e. also perpendicular to the direction of the extension.

In other embodiments, it is additionally provided for applying the magnetic field in parallel to an extension direction of the mechanically deformable region the deformation of which is detected by the sensor element. In such a configuration, it is possible to provide the magnetizations of the magnetically hard and magnetically soft layers in parallel, the magnetizations in turn being perpendicular to the magnetic field generated and the extension direction. Such an arrangement is particularly characterized by a very broad region of linearity so that this arrangement is of advantage for many applications.

In order to form a sensor, a sensor element may also be coupled to another sensor element of the same kind or a different sensor element to form a half-bridge. In one embodiment, another sensor element may serve as a reference element when it is arranged on the deformable region such that the extension direction at the position of the reference element is parallel to the magnetizations of the soft and magnetically hard layers of the reference element so that a deformation or extension has no influence on the magnetization vector of the magnetically soft sensor layer of the reference element. Preferably, the magnetic field for both the detection sensor element and for the reference sensor element is generated having an equal intensity and an equal direction relative to the resistance orientation, which may, for example, be achieved by conductor structures arranged at right angles to one another which are connected to one another. The above arrangement with reference sensor elements allows generating a low-offset and low-drift output signal.

Another half-bridge corresponding to the half-bridge described above may additionally be arranged on the deformable region. Preferably, the four sensor elements with a rectangular or squared deformable region are each arranged at right angles to one another, i.e. in a rectangular or squared pattern, at the sides of the deformable region. In general, the deformable region, however, may comprise any form and symmetry.

In another preferred embodiment where the magnetic field is also generated perpendicularly to the extension direction at the position of the sensor, it may further be provided for the magnetization of the magnetically hard layer and the magnetization of the magnetically soft layer not to be parallel with no magnetic field applied, i.e. with an angle greater than 0°. In this embodiment, a rectangular arrangement of the two magnetizations is preferably provided. The two magnetizations are arranged relative to the magnetic field and the extension direction such that each of the two magnetizations has an angle greater than 0° and smaller than 90°. Preferably, the two magnetizations may be arranged perpendicularly to each other with no magnetic field applied, wherein the magnetically hard layer has an angle of +45° and −45°, respectively, relative to an axis perpendicular to the extension direction.

This configuration allows arranging four sensor elements to form a full-bridge where each of the sensor elements serves as a detection sensor element. The four sensor elements of the full-bridge may, for example, be arranged at right angles at the sides of a membrane basically having a squared form, wherein each of the sensor elements serves as a detection sensor element. The arrangement in a full-bridge described above allows a signal optimization so that each of the sensor elements provides a contribution to the measurement signal when the membrane deforms and generates an extension in the corresponding extension direction at each side.

As has already been mentioned, a certain operating point or operating range having a particularly high sensitivity or a particularly high linearity may be chosen selectively by generating an external magnetic field. This can, for example, be obtained by adjusting a new magnetic field when the linearity or the sensitivity deviates from a predetermined value by a predetermined magnitude, which is how switching to a new operating point on a characteristic curve associated to the magnetic field applied takes place.

In a preferred embodiment, it is possible to keep an electrical resistance at a predetermined value by suitably controlling the external magnetic field by maintaining a predetermined direction of the magnetization of the magnetically soft layer when the extension changes. This has the advantage that by adjusting the current for the external magnetic field, the current is proportional to the measured quantity of the extension such that a simple detection can be achieved. Additionally, this principle is of advantage in that there is a dependence on the extension with reduced non-linearity over the entire extension range. The external magnetic field could either be generated, as has been described above, by a device integrated on the substrate or by a device not arranged on the substrate.

Another advantage of this method is that the sensor system, for example on a spin-valve base, cannot be saturated since the polarization of the soft layer is not switched. The extension can thus theoretically be pushed to the plastic deformation limit as long as the external magnetic field is strong enough for compensation.

BRIEF DESCRIPTION OF THE DRAWINGS

Preferred embodiments of the present invention will be detailed subsequently referring to the appended drawings, in which:

FIG. 3 shows a schematic illustration of a top view on a sensor according to a third embodiment of the present invention;

DESCRIPTION OF PREFERRED EMBODIMENTS

Figure 1:
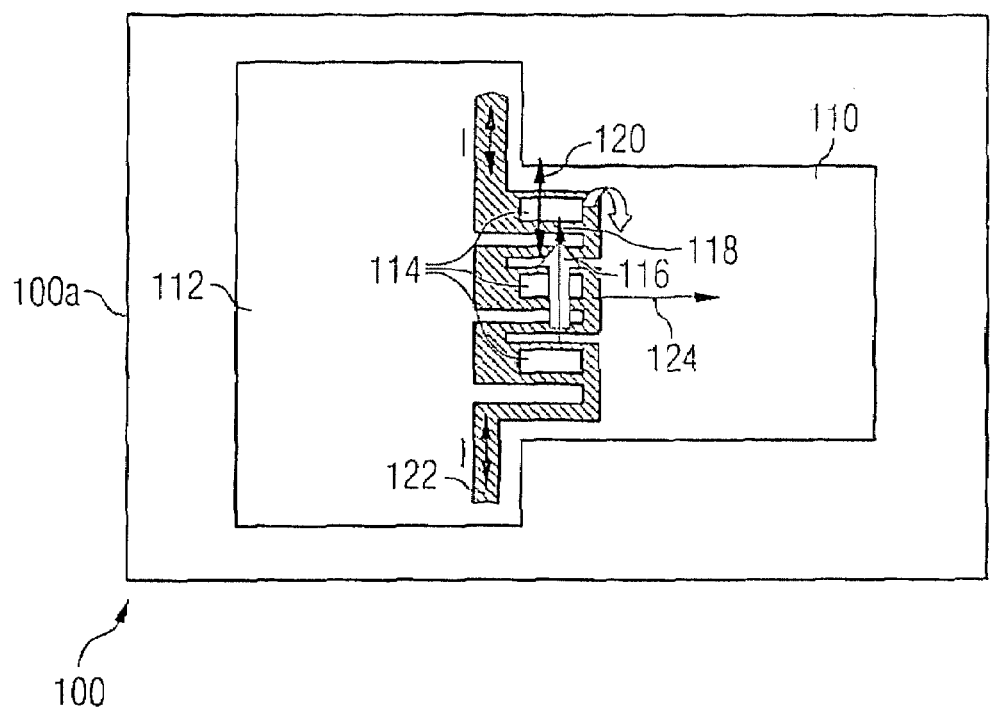
FIG. 1 shows a schematic illustration of a top view on a sensor according to a first embodiment of the present invention.

Preferred embodiments will be discussed in greater detail subsequently referring to FIGS. 1 to 7, elements of the same kind being designated by the same reference numerals throughout the figures.

A sensor 100 will be discussed as a first embodiment of the present invention referring to FIG. 1. The sensor 100 comprises a substrate 100a having a bending beam 110 which experiences a deformation, i.e. an extension or mechanical strain, with an acceleration due to the inertial force acting on the bending beam 110. The bending beam or cantilever 110 is connected to a solid region 112 of the substrate such that only the movable bending beam will be bent when an acceleration occurs. Sensor elements 114 are deposited on the bending beam in the region of the greatest extension of the movable bending beam 110, i.e. close to the connection between the bending beam 110 and the solid body 112. The sensor elements may be connected in series for detecting the extension of the bending beam.

In one embodiment, the sensor elements 114 are GMR resistance structures able to detect the extension due to a change in the magnetization direction of the magnetically soft layer relative to the magnetization direction of the magnetically hard layer. In this embodiment, the magnetically hard layer and the magnetically soft layer are polarized such that the extension is perpendicular to both directions. Due to the extension, the magnetization of the soft layer is rotated in the direction of the extension, whereby the resistance of the sensor elements 114 increases. Although in this embodiment the magnetizations of the magnetically soft layer and the magnetically hard layer are polarized such that they are parallel to each other with no magnetic field applied and no extension applied, the magnetizations of the two layers in other embodiments may also comprise an angle greater than 0°.

In FIG. 1, the magnetization of the magnetically hard layer is illustrated by a small thick arrow having the reference numeral 116, whereas the magnetization of the magnetically soft layer is illustrated by a longer and thinner arrow having the reference numeral 118.

Inventively, a magnetic field 120 is generated for influencing the performance of the sensor elements, which in this embodiment takes place by means of a conductor structure 122 extending over the sensor elements 114. More precisely, the conductor structure has a meandering shape such that an electrical current flows in the same direction through the portions of the conductor structure 122 above the respective sensor elements, such that a magnetic field preferably having the same intensity and the same direction is generated in each sensor element. As can be seen from FIG. 1, the conductor structure 122 is formed such that the electrical current in the conductor structure 122 flows such that a magnetic field may be generated which in the level of the sensor elements 114 is parallel or anti-parallel to the magnetizations of the magnetically hard and magnetically soft layers, respectively, referring to the case that no extension is generated in the deformable region. This means that in this embodiment the direction of the magnetic field generated by the conductor structure 122 will always be perpendicular to the extension direction 124 which may be generated in the bending beam 110.

As has already been explained above, the magnetization of the magnetically soft layer changes due to the extension of the bending beam in that it rotates in the direction of the extension direction depending on the intensity of the extension applied, for the case that the soft magnetic layer is made of a material having a positive magnetostriction constant.

According to the invention, the performance of the sensor elements 114 is influenced by the magnetic field generated. More precisely, the rotation of the magnetization of the soft layer can be influenced by generating the magnetic field such that the result is a performance of the sensor elements 114 depending on both the extension applied and the magnetic field applied.

Figure 4A:
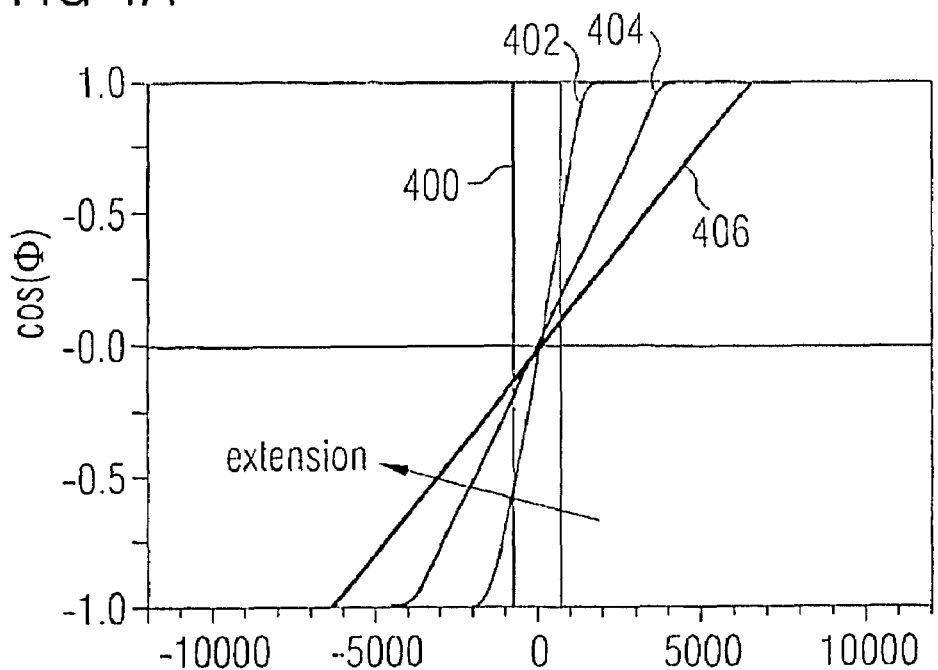
FIG. 4a shows an illustration of the dependence of a cosine of the angle between the magnetizations of the magnetically hard and magnetically soft layers in dependence on a magnetic field applied for several extension applied for a single element of the sensor illustrated in FIG. 1 according to an inventors' calculation.

An illustration of the dependence of the angle between the magnetizations of the magnetically soft layer and the magnetically hard layer as a function of the magnetic field applied is shown in FIG. 4a for a single sensor element. The illustrations shown in FIG. 4a illustrate qualitative simulations performed by the inventors.

FIG. 4a shows the cosine of the angle between the magnetically hard and magnetically soft layer as a function of the magnetic field strength applying for respectively different extension values. The reference numeral 400 illustrates the course resulting with no extension applied. As can be seen, there are marked hysteresis effects, wherein the magnetization of the magnetically soft layer switches from a parallel setting with regard to the magnetization of the magnetically hard layer to an anti-parallel setting and vice versa basically without transition. Thus, with no magnetic field applied (H=0), the direction of the two magnetizations is either parallel or anti-parallel. As can be recognized, the course described above changes when there is an extension at the bending beam. The graph shapes referred to by the reference numerals 402, 404 and 406 all correspond to an increasing extension. In contrast to the course 400, the graph shapes 402, 404 and 406 do not have hysteresis effects and additionally exhibit a linear increase over a wide range.

Figure 4B:
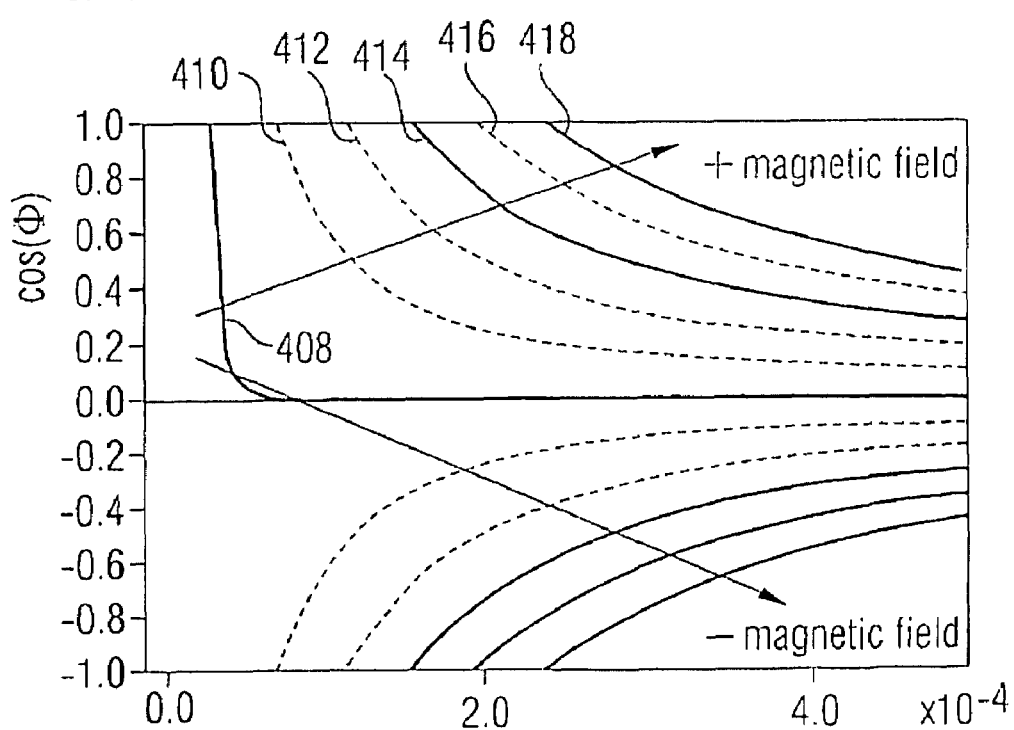
FIG. 4b shows an illustration of a graph shape of the cosine between the magnetizations of the magnetically hard and magnetically soft layers in dependence on an extension applied for several magnetic fields applied according to an inventors' calculation for a single element of the sensor shown in FIG. 1.

FIG. 4b shows the course of the angle of the magnetizations as a function of the extension for the same resistance sensor element. The graph shape 408 thus describes a course with no extension applied, whereas the courses 410, 412, 414, 416 and 418 each correspond to an increasing value of the magnetic field strength. Depending on the direction of the magnetic field applied, i.e. parallel to the magnetization of the magnetically hard layer or anti-parallel to the magnetization of the magnetically soft layer, the magnetization of the magnetically hard layer settles at an angle between 0° and 90° or in a range between 90° and 180°. With an increasing magnetic field strength, the courses are shifted to higher extension values. As will be explained subsequently, the changes, caused by generating the magnetic field, of the dependence of the angle on the extension may be employed to advantage to select an operating point or an operating range such that an increased linearity, an increased sensor sensitivity and a considerably improved reproducibility can be achieved.

Figure 2:
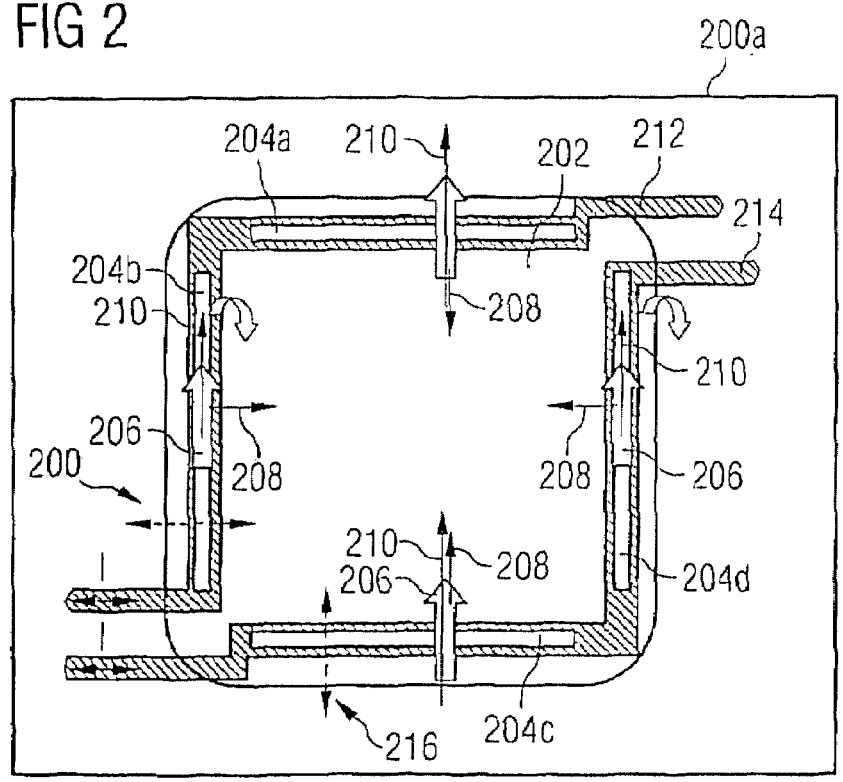
FIG. 2 shows a schematic illustration of a top view on a sensor according to another embodiment of the present invention.

Another embodiment of the present invention is illustrated in FIG. 2. FIG. 2 shows a schematic top view on a sensor which may, for example, be employed for measuring a pressure. The sensor 200 includes a substrate 200a on which a mechanically deformable region formed as a membrane 202 is formed.

In the region of a maximum extension, i.e. at the edge of the square-shaped membrane 202, strip-form sensor elements 204a, b, c, d are arranged, wherein two respective sensor elements are deposited in a first direction, i.e. a "vertical orientation", and two sensor elements are deposited in a second direction perpendicular to the first direction, i.e. a "horizontal" orientation. It is to be mentioned here that the terms vertical and horizontal only refer to the illustration in the figures and do not refer to the actual orientation of the sensor elements in an application of the sensor.

The sensor elements may, for example, include GMR/TMR resistors. A vertical and a horizontal sensor element, i.e. the sensor elements 204a and 204b and 204c and 204d, respectively, are each connected to form a half-bridge, wherein the vertically arranged sensor elements 204b and 204d serve as measuring sensor elements, whereas the horizontally arranged sensor elements 204a and 204c in the respective half-bridges serve as reference sensor elements. The magnetizations in each of the sensor elements are such that the magnetically hard layer has a magnetization 206 which is parallel to the longitudinal axis of the measuring sensor elements.

By applying an external pressure on the membrane 202 the sensor elements are extended perpendicularly to their longitudinal axis in an extension direction 208. In the case of materials for a soft magnetic layer having a positive magnetostriction constant, this for energetic reasons results in a rotation of the polarization of the soft layer from the parallel position in sensor elements. In the reference sensor elements, however, no change in the soft polarization 210 results for energetic reasons. The arrangement illustrated in FIG. 2 represents a half-bridge allowing an offset-reduced and drift-reduced output signal to be obtained.

Additionally, the sensor 200 includes current conductor structures 212 and 214, each associated to one of the half-bridges, integrated on the substrate. The current conductors deposited on the passivated GMR/TMR structures allow generating a magnetic field 216 in parallel to the direction of the extension 208.

Figure 5A:
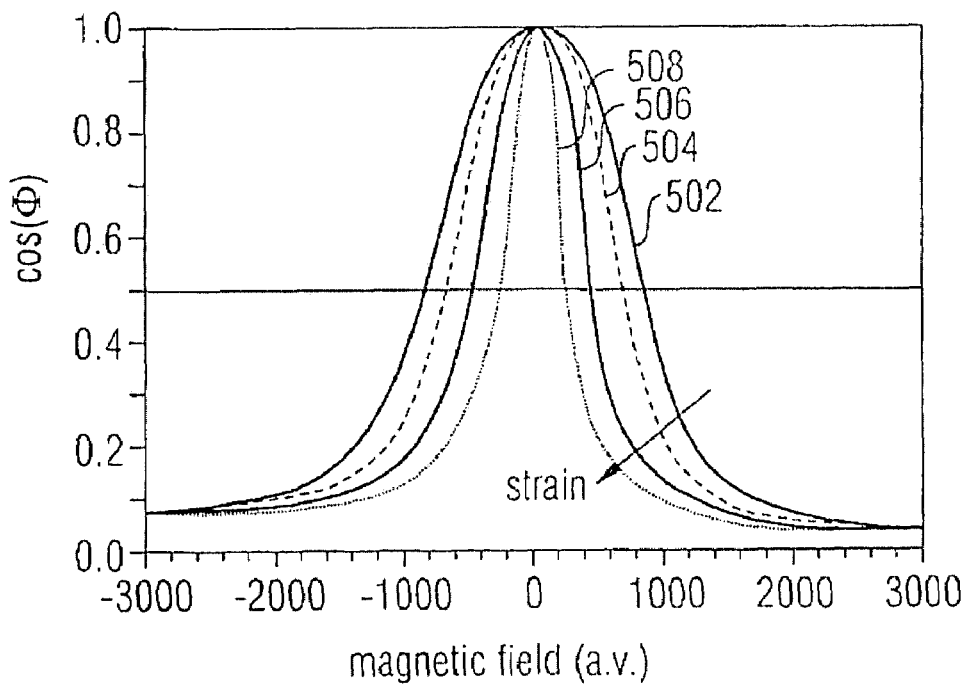
FIG. 5a shows an illustration of a graph shape of the cosine of the angle between the magnetizations of the magnetically hard and magnetically soft layers in dependence on the magnetic field applied for several extensions applied for a single element of the sensor of FIG. 2 according to an inventors' calculation.

FIG. 5a shows calculations by the inventors illustrating an effect on the cosine (Φ) as a function of the magnetic field and the extension. The reference numerals 502, 504, 506 and 508 each refer to graph shapes with an increasing extension. Thus, it can be seen that with an increasing extension a smaller magnetic field strength is required to obtain a predetermined angle between 0° and 90°. This results from the fact that in this embodiment the extension direction and the magnetic field generated are parallel to each other such that a rotation of the magnetically soft layer in a direction corresponding to a rotational direction also obtained when generating a magnetic field is caused by the effect of the extension.

Figure 5B:
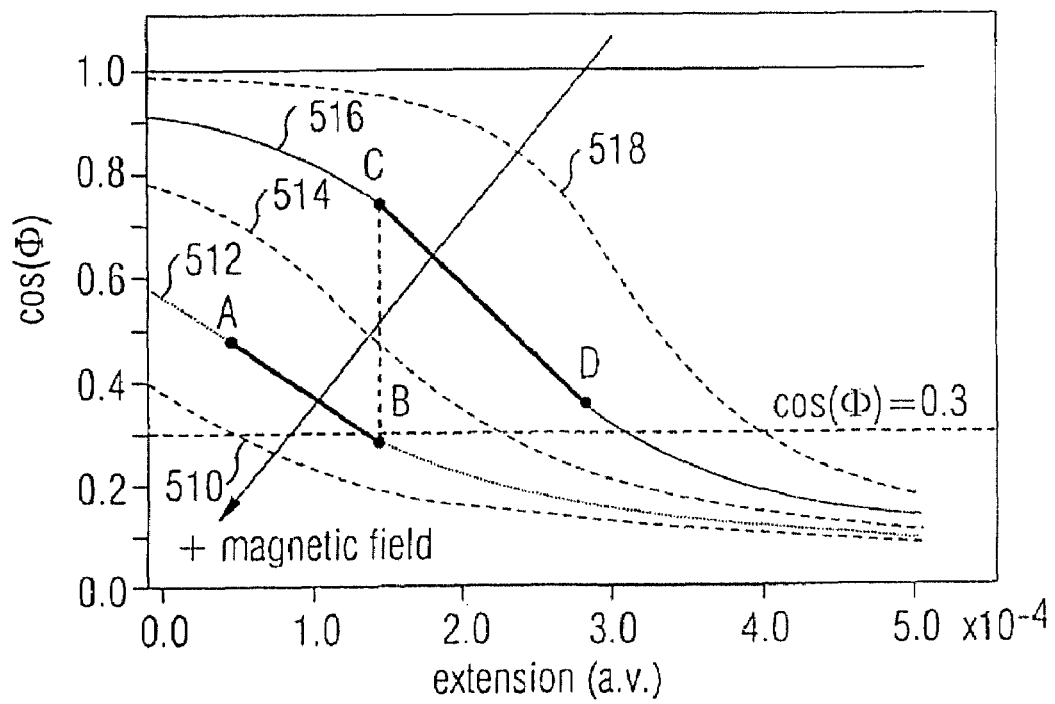
FIG. 5b shows an illustration of the course of the cosine of the angle between the magnetizations of the magnetically hard layer and the magnetically soft layer in dependence on an extension applied for several magnetic fields for a single element of the sensor illustrated in FIG. 2 according to an inventors' calculation.

FIG. 5b shows the angle of the two magnetizations as a function of the extension for different magnetic fields. As can be recognized in FIG. 5b, a graph shape is shifted to higher extension values by applying the magnetic field so that an approximately linear course can be achieved even for high extension values by correspondingly selecting a certain characteristic curve. In particular, the course illustrated in FIG. 5b, compared to the course illustrated in FIG. 1b, has considerably greater regions with an approximately constant linearity and increased sensitivity so that the arrangement according to FIG. 2 is particularly suitable for detecting mechanical deformations.

FIG. 3 shows another embodiment of the present invention differing from the embodiment according to FIG. 2 in that the sensor elements are connected to form a full-bridge. In this embodiment, the magnetization direction of the magnetically hard layer 206 and the magnetization direction 210 of the soft layer are arranged perpendicularly to each other for each of the sensor elements 204a-204d. The magnetization directions 206 and 210 are also oriented at an angle of 45° relative to the extension direction 208, wherein the extension direction according to the embodiment of FIG. 2 is parallel to the direction of the magnetic field 216 generated. In this embodiment, both the vertical sensor elements 204b and 204d and the horizontal sensor elements 204a and 204c change, when a pressure is applied, their resistances in a reverse manner since the polarizations of the magnetically soft layers in the horizontally arranged sensor elements 204a and 204c rotate clockwise, i.e. in the direction of the magnetization of the magnetically hard magnetic layer, whereas the magnetizations of the magnetically soft layers of the sensor elements 204b and 204d which are arranged vertically rotate, by the extension applied, in a counter-clockwise direction, i.e. away from the direction of the magnetically hard layer, as is illustrated in FIG. 3 by arrows.

Figure 6A:
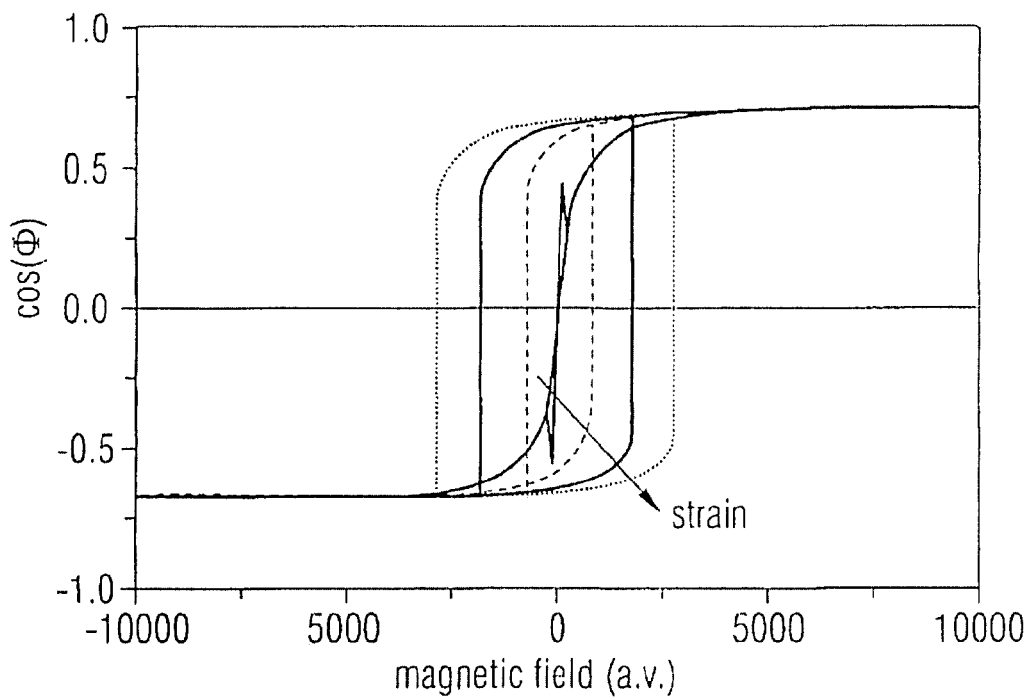
FIG. 6a shows an illustration of a course of the cosine of the angle between the magnetizations of the magnetically hard layer and the magnetically soft layer in dependence on a magnetic field applied for a single element of the sensor illustrated in FIG. 3 according to an inventors' calculation.

FIG. 6a shows the effect on the rotating behavior of the soft polarization in dependence on a magnetic field according to calculations by the inventors. It can be seen here that the magnetic field strength required for deflecting the magnetization of the soft layer from the predetermined direction, i.e. a coercive force, increases with an increasing extension.

Figure 6B:
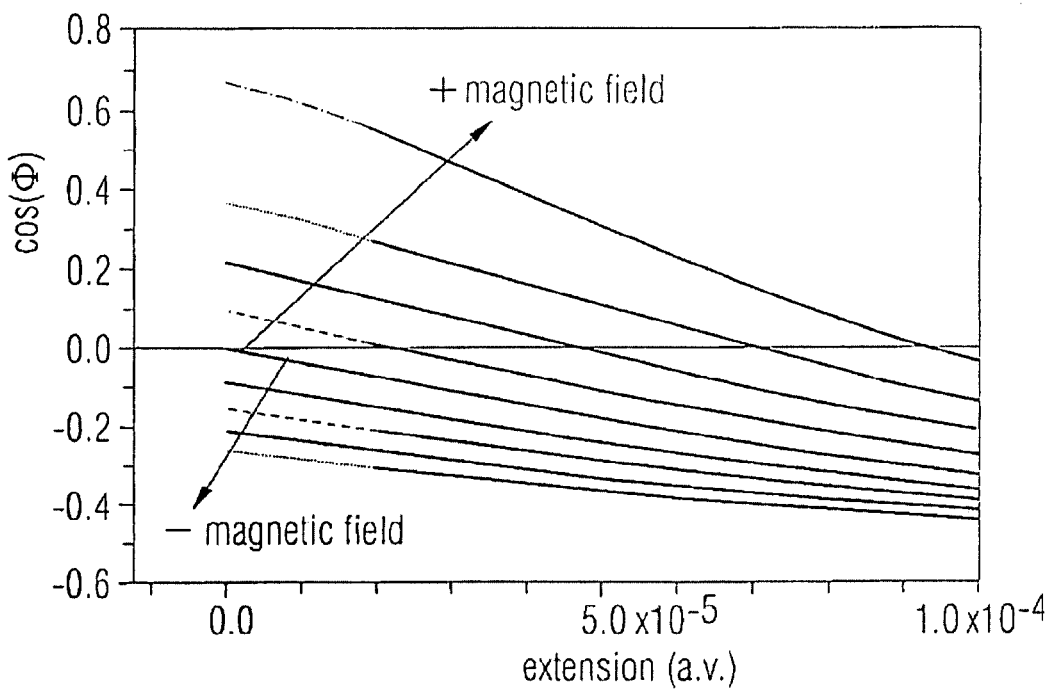
FIG. 6b shows an illustration of a course of the cosine of the angle between the magnetizations of the magnetically hard layer and the magnetically soft layer in dependence on an extension applied for several magnetic fields for a single element of the sensor illustrated in FIG. 3 according to an inventors' calculation.

FIG. 6b shows the course of the cosine of the angle in dependence on the extension for different field strengths for the individual elements of the embodiment shown in FIG. 3. Here, an asymmetry between the graphs having positive magnetic fields and graphs having negative magnetic fields can be observed. More precisely, a stronger rotation is obtained by applying a magnetic field in the positive direction than by applying the same magnetic field strength in the negative direction, which manifests itself in a different angle of the magnetizations of the magnetically hard and magnetically soft layers.

Subsequently, some preferred ways of influencing the performance of the sensor element will be explained referring to the half-bridge characteristic shown in FIG. 5b.

An extension of the operating range can, for example, be obtained using the contexts described above, as will be explained subsequently. If the GMR/TMR sensor element is biased by a magnetic field, the linear range between the points A and B can be swept using extension. If the characteristic curve was swept beyond the point B, this would entail a reduction in sensitivity and linearity. By inventively providing a device for generating a magnetic field on the substrate, it can be achieved that a transition from a first characteristic curve to a second characteristic curve can be initiated. Referring to FIG. 5b, the characteristic curve 512, for example, can be swept from point A to point B and then a transition to point C of the characteristic curve 516 can be initiated. By further increasing extension, a constant high sensitivity and linearity can be achieved until point D on the characteristic curve 516 is reached. What follows is a transition to another characteristic curve, etc. The switching points as a function of the GMR/TMR sensor element and the magnetic field can be obtained in a sensor calibration, for example as a reference curve, and be stored in, for example, a look-up table. Thus, a constant high sensitivity and linearity can be achieved over an entire application range.

In another embodiment referred to as resistance-balance principle, a predetermined angle between the magnetically hard layer and the magnetically soft layer is kept independently of the extension so that the GMR/TMR resistance is kept constant. For this, the bias magnetic field is varied continually so that the rotation of the polarization of the soft layer caused by the extension is compensated by a magnetic field. The dashed line with the reference numeral 520 in FIG. 5b in parallel to the x-axis is to illustrate exemplarily how the resistance of the sensor element can be kept constant by changing between the different characteristic curves depending on the magnetic field, like, for example, as is shown in FIG. 5b, at a value where the cosine of the angle is 0.3. The output signal is measured and kept constant by adjusting the current for the external magnetic field so that a current is detected as a measured quantity proportional to the extension. Put differently, in this embodiment the sensor elements only provide a signal used for adjusting the magnetic field current, whereas the measured signal is derived from the value of the magnetic field current. The resistance-balance principle has the advantage of a strongly linear dependence on the extension over the entire extension range.

Figure 7:
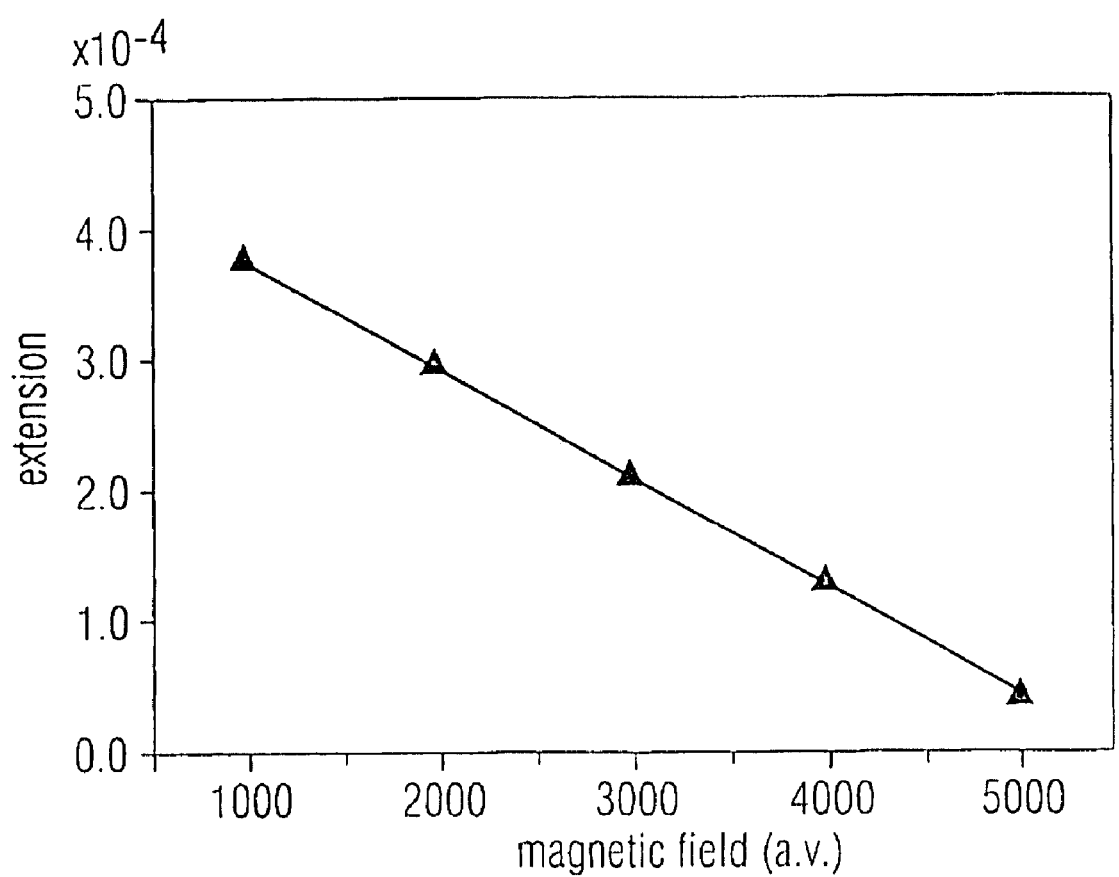
FIG. 7 shows an illustration of the dependence of an extension applied on a compensation magnetic field in a resistance-balance Mode for a single element of the sensor illustrated in FIG. 2 according to an inventors' calculation.

FIG. 7 shows a calculation of the dependence of the extension on a magnetic field strength for the resistance-balance mode described above. As can be seen, a strongly linear dependence results over the entire range of an extension. Thus, an output signal linear over the entire operating range having high sensitivity can be achieved without complicated signal processing. Due to the fact that the polarization of the soft layer is not rotated, the spin-valve system cannot be saturated as long as the external magnetic field is strong enough for compensation. Theoretically, the rotation may be pushed to the plastic deformation limit of the mechanically deformable region.

In addition to the above methods for adjusting an operating point or an operating range, an offset in the sensor element can also be compensated by inventively applying a magnetic field. For this, the magnetic field is additionally adjusted in the above-described method depending on the offset present. Correspondingly, a temporal drift, such as, for example, due to temperature changes or other parameters which may cause a drift, can be compensated by inventively generating a magnetic field.

Although the adjusting of the operating point and the operation in a resistance-balance mode have been described above for a device for generating the magnetic field integrated on the substrate, these functionalities may also be obtained by generating a compensating magnetic field generated by a device not integrated on the substrate.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A sensor comprising:
a substrate comprising a mechanically deformable region that is deformable in a direction non-parallel to a surface of the substrate;
a magnetostrictive multi-layer sensor element configured to detect a mechanical deformation of the mechanically deformable region in a direction that is non-parallel to the substrate surface, the multi-layer sensor element comprising a sensor layer comprising a material having a positive or a negative magnetostriction constant; and
a device, arranged on the substrate, configured to generate a controllable magnetic field by which a performance of the magnetostrictive multi-layer sensor element is influenced, wherein the magnetostrictive multi-layer sensor element comprises an electrical resistance that is a function of the controllable magnetic field and a deformation of the mechanically deformable region, the electrical resistance forming a part of a half- or full-bridge.

2. The sensor according to claim 1, wherein the magnetostrictive multi-layer sensor element comprises a magnetic layer system comprising at least two magnetic layers and a non-magnetic layer, the magnetic layer system being formed such that the magnetization directions of at least two neighboring magnetic layers change when extended.

3. The sensor according to claim 1, wherein the magnetostrictive multi-layer sensor element comprises a GMR sensor element or a TMR sensor element.

4. The sensor according to claim 1, wherein the magnetostrictive multi-layer sensor element comprises a magnetostrictive spin-valve sensor element.

5. The sensor according to claim 1, wherein the device configured to generate a controllable magnetic field is integrated in the substrate.

6. The sensor according to claim 5, wherein the device configured to generate a controllable magnetic field includes a conductor structure.

7. The sensor according to claim 6, wherein the conductor structure comprises a straight longitudinal region extending over the magnetostrictive multi-layer sensor element.

8. The sensor according to claim 1, wherein the mechanically deformable region comprises a bending beam or a membrane.

9. The sensor according to claim 1, wherein the magnetostrictive multi-layer sensor element comprises a spin-valve sensor element and the device for generating a controllable magnetic field is configured to rotate a magnetization direction of a magnetically soft layer of the spin-valve sensor element, thereby influencing an electrical resistance of the spin-valve sensor element.

10. The sensor according to claim 1, wherein the magnetostrictive multi-layer sensor element and the device configured to generate a controllable magnetic field are arranged such that the generated magnetic field has a component in an extension direction of the mechanically deformable region at the position of the magnetostrictive multi-layer sensor element.

11. The sensor according to claim 10, wherein the magnetostrictive multi-layer sensor element and the device configured to generate a controllable magnetic field are arranged such that the generated magnetic field and the extension direction of the mechanically deformable region at the position of the magnetostrictive multi-layer sensor element are parallel to each other.

12. The sensor according to claim 1, wherein the magnetostrictive multi-layer sensor element and the device configured to generate a controllable magnetic field are arranged such that the generated magnetic field is perpendicular to an extension direction of the mechanically deformable region at the position of the magnetostrictive multi-layer sensor element.

13. The sensor according to claim 1, wherein the magnetostrictive multi-layer sensor element comprises a spin-valve sensor element, and wherein a magnetization of a magnetically hard layer of the spin-valve sensor element and a magnetization of a magnetically soft layer of the spin-valve sensor element, without a magnetic field applied thereto and without a mechanical deformation of the mechanically deformable region, are parallel or anti-parallel to each other.

14. The sensor according to claim 1, wherein the magnetostrictive multi-layer sensor element comprises a spin-valve sensor element, and wherein a magnetization of a magnetically hard layer and a magnetization of a magnetically soft layer of the spin-valve sensor element, without a magnetic field applied thereto and without a mechanical deformation of the mechanically deformable region, comprise an angle between 0° and 180°.

15. The sensor according to claim 14, wherein the spin-valve sensor element is formed so that the magnetization of the magnetically hard layer and the magnetization of the magnetically soft layer, without a magnetic field applied thereto and without a mechanical deformation of the mechanically deformable region, are perpendicular to each other.

16. The sensor according to claim 1, wherein the magnetostrictive multi-layer sensor element comprises a spin-valve sensor element arranged such that a magnetization of a magnetically hard layer thereof is parallel to an extension of the mechanically deformable region at the position of the spin-valve sensor element.

17. The sensor according to claim 1, wherein the magnetostrictive multi-layer sensor element comprises a spin-valve sensor element arranged such that a magnetization of a magnetically hard layer thereof and an extension direction of the mechanically deformable region at the position of the spin-valve sensor element comprise an angle of ±45° or ±135°.

18. The sensor according to claim 1, further comprising another magnetostrictive multi-layer sensor element.

19. The sensor according to claim 18, wherein the magnetostrictive multi-layer sensor element and the another magnetostrictive multi-layer sensor element are connected together to form a half-bridge, and wherein the another magnetostrictive multi-layer sensor element comprises another spin-valve sensor element and is arranged such that an extension of the mechanically deformable region at the position of the another magnetostrictive multi-layer sensor element does not influence a magnetization direction of a soft magnetic layer associated therewith.

20. The sensor according to claim 18, wherein the another magnetostrictive multi-layer sensor element comprises another spin-valve sensor element arranged such that a magnetization of a magnetically hard layer associated therewith is perpendicular to an extension direction of the mechanically deformable region at the position of the another magnetostrictive spin-valve sensor element.

21. The sensor according to claim 18, wherein the another magnetostrictive multi-layer sensor element comprises another spin-valve sensor element arranged such that an angle between a magnetization of a magnetically hard layer associated therewith and an extension direction of the mechanically deformable region at the position of the another magnetostrictive spin-valve sensor element has a value of ±45°.

22. The sensor according to claim 1, further comprising a controller operably connected to the device configured to generate a controllable magnetic field, wherein the controller is configured to control the device configured to generate a controllable magnetic field when a predetermined value of a linearity or a sensitivity of an output characteristic curve of the magnetostrictive multi-layer sensor element is below or exceeds a predetermined magnitude such that a magnetic field differing from a previous magnetic field is generated.

23. The sensor according to claim 22, wherein the controller is further configured to keep a resistance of the magnetostrictive multi-layer sensor element substantially constant independently of a deformation of the mechanically deformable region.

* * * * *